Aug. 26, 1924.
F. T. TOFFEY
1,506,694
MILK CAN HANDLE
Filed July 5, 1921      2 Sheets-Sheet 1
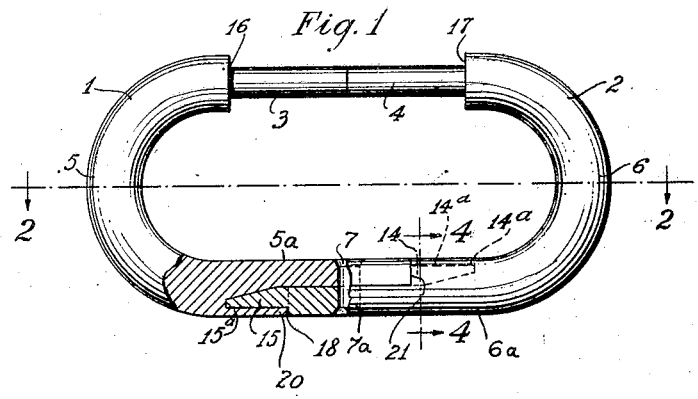
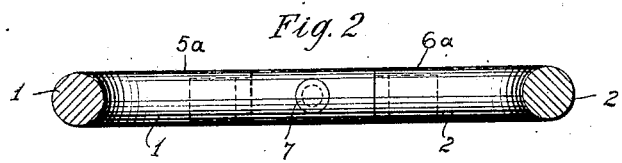
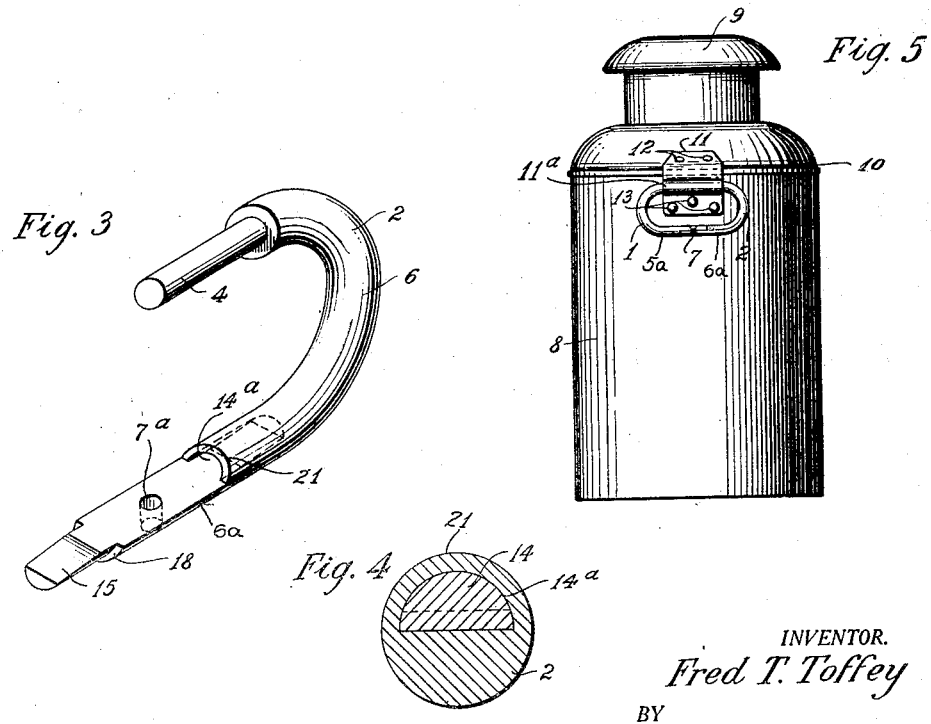
INVENTOR.
Fred T. Toffey
BY
H. G. Manning
ATTORNEY.

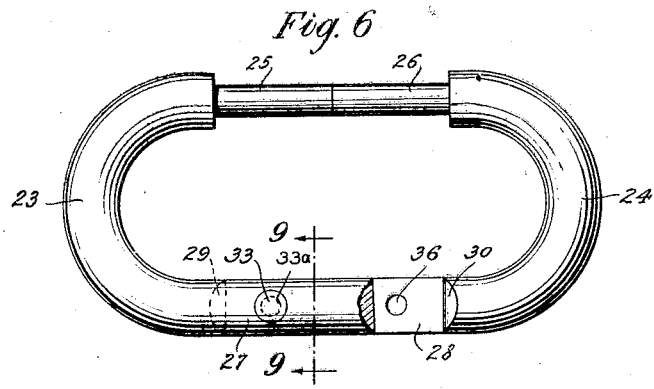
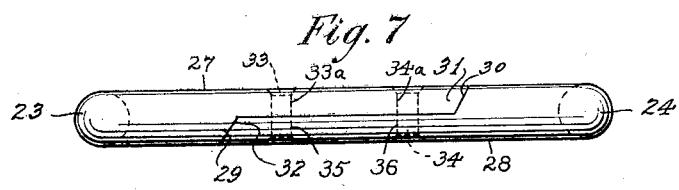
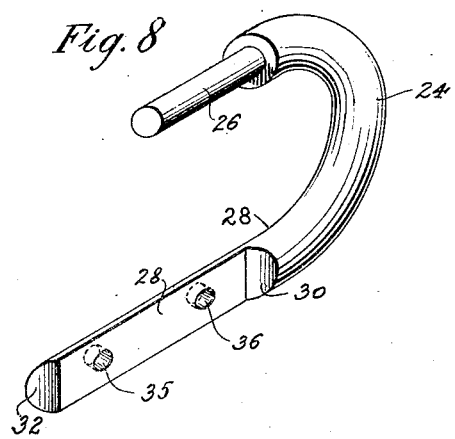
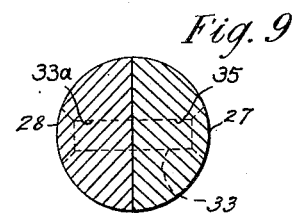

Patented Aug. 26, 1924.

1,506,694

UNITED STATES PATENT OFFICE.

FRED T. TOFFEY, OF WATERTOWN, CONNECTICUT.

MILK-CAN HANDLE.

Application filed July 5, 1921. Serial No. 482,579.

*To all whom it may concern:*

Be it known that I, FRED T. TOFFEY, a citizen of the United States, and a resident of Watertown, county of Litchfield, and State of Connecticut, have invented certain new and useful Improvements in Milk-Can Handles, of which the following is a specification.

This invention relates to improvements in milk-can handles and more particularly to the swinging or loop form of handles usually employed on the common form of milk-can used to transport milk from the dairy to the consumer.

It has been found in the use of the solid one-piece handles, now in general use, that they often break off, due to the rough usage to which the cans are necessarily subjected in transit. The milk-can then must remain out of commission until a new handle can be attached. To put on a new handle of the old one-piece type, it was necessary to first remove from the can, the hinge-bracket within which the broken handle was pivoted before a new handle could be inserted. This removal involved the operation of cutting off the rivets which held the bracket to the can, and by reason of this cutting operation, there was constant danger of permanently injuring the can or causing it to become leaky at the rivet holes. Leaky cans, of course, are objectionable, on account of waste of milk contained in the cans, or its contamination with dirt or disease germs. In some forms of milk-cans, the hinge-brackets are securely soldered or welded to the can, and the removal of such brackets offered even greater difficulties.

It is an object of the present invention to overcome the above and other disadvantages by providing a two-part handle which may be quickly and easily installed upon the can without the necessity of first removing the hinge-bracket.

Another object is to provide such a handle of simple construction and which will be strong and durable in use.

A further object is to provide a handle which may be cheaply, quickly and rapidly manufactured without the need of special tools or other equipment.

With these and other objects in view, there is illustrated in the accompanying drawings, two forms of convenient embodiments of this invention.

Fig. 1 represents a side view of one form of two-part handle, with the parts in assembled relation.

Fig. 2 is a sectional view taken along the line 2—2 of Fig. 1, looking in the direction of the arrows.

Fig. 3 is a perspective view of the left hand section of the handle shown in Fig. 1.

Fig. 4 is a section on an enlarged scale taken along the line 4—4 of Fig. 1, looking in the direction of the arrows.

Fig. 5 is a side view of a milk-can to which one of the handles, illustrated in Figs. 1 to 4, has been attached.

Fig. 6 is a side view of a modified form of two-part handle embodying the principles of this invention.

Fig. 7 is a bottom view of the handle shown in Fig. 6.

Fig. 8 is a perspective view of the left hand section of the handle shown in Fig. 6.

Fig. 9 is a sectional view taken along the line 9—9 of Fig. 6, looking in the direction of the arrows.

Referring now to the first embodiment of the invention illustrated in Figs. 1 to 5, the handle shown therein consists of a hinge link or loop made up of two opposed co-operating U-shaped members 1 and 2, adapted to pivot or swing as a unit in the hinge-bracket of a milk-can. The U-shaped members 1 and 2 are provided with pintle or pivot ends 3 and 4, which preferably are cylindrical in shape and of smaller diameter than the remainder of the handle members, as shown in Figs. 1 and 5. These pintles 3 and 4 form pivot bearings for the handle when it is attached to the hinge-bracket of the milk-can, the pintles being then concealed from view, as will be hereinafter more fully described.

The middle or intermediate portions, 5 and 6, of the handle members, 1 and 2, are semicircular in shape, and circular in cross-section, as shown in Figs. 1 and 2. Adjoining these intermediate portions 5 and 6, are overlapping gripping extensions $5^a$ and $6^a$ of semicircular cross-section, and having contacting faces, held together by a single rivet $7^a$, which passes through rivet holes 7 in said gripping extensions.

The milk-can 8, which is shown in Fig. 5, may be of any suitable construction, but preferably has a cover 9, a rim 10, and a hinge-bracket 11—with a hinge-socket 11ª— secured to the can by rivets 12 and 13, the rivet 12 above the rim 10, and rivet 13 below it.

Formed upon the ends of the gripping extensions 5ª and 6ª are the beveled tongues 14 and 15, which are shaped to dovetail within the semicylindrical hollow sockets 14ª and 15ª.

In assembling the handle members, the pintle ends 3 and 4 are first inserted into the opposite ends of the hinge-socket 11ª on the can and then the flat faces of the gripping extensions are brought into contact. The members 1 and 2 are then forced toward one another until the shoulders 18 and 19 strike the ends of the hollow sockets 20 and 21, at which time, the pintle shoulders 16 and 17 will be adjacent the edges of the hinge-socket 11ª. The rivet 7 is next inserted in the rivet holes 7ª, and after the rivet has been "upset," the handle is a complete unitary rigid structure; and the can is ready for further use.

In the second illustrative embodiment of the two-part handle, shown in Figs. 6 to 9, the pintle sections 25 and 26 as well as the intermediate sections 23 and 24, are identical in shape with the corresponding parts 3, 4, 5 and 6 of the first embodiment as shown in Figs. 1 to 5. The overlapping sections or gripping extensions 27 and 28, however, differ from the corresponding extensions 5ª and 6ª, in several important particulars. While they are semicircular in cross-section as before, the plane of contact of their flat faces coincides with the plane of the loop or link of the assembled handle itself,—instead of being perpendicular to said loop as in the former embodiment of the invention. Moreover, no dovetailing tongues and sockets are provided,—the gripping portions or extensions 27 and 28 merely having inclined bevels 29 and 30, which bevels form seats for the extremities 32 and 31 of the extensions respectively. Another difference is that two rivets are employed instead of one, these rivets in this embodiment, being designated by the numerals 33 and 34.

When it is desired to secure the handle members in assembled position, the rivet 33 is "upset" in rivet holes 33ª and 35, while the rivet 34 is "upset" in the rivet holes 34ª and 36.

As will be evident from the above description the two members of the handle in the second illustrative embodiment are identical in shape, and consequently may be interchanged at will for one another. This fact is of great advantage in the manufacture of these handles, because it eliminates the necessity of using two designs for the members of the handle—both of which may be cast from the same mold or machined from the same pattern.

While both forms of handles described above may be made in any desired manner and from any suitable material, it is preferred to cast them in suitable molds out of malleable cast iron. Moreover, any other means for rigidly uniting the handle members may be employed, if desired, but rivets are preferred, as they enable the handle to present a smooth exterior free from projections which might injure the hands of the user.

While there has been disclosed in this specification, two preferred forms which the invention may assume in practice, it is to be understood that the same are shown for purposes of illustration, and that the invention may be modified and embodied in various other forms without departing from its spirit; in short the invention is not limited to the specific disclosure herein presented, but includes all the modifications coming within the scope of the appended claims.

Having thus described the invention, what is claimed as new, and for which Letters Patent is desired is:

1. A two-part handle for milk-cans and the like, comprising a pair of loop forming members, each of said members having a grip section having a flat side and a pivot section, said grip sections being secured together at their flat sides in rigid overlapping relation, and said pivot sections being adapted to engage within a hinge bracket secured to a milk can.

2. A handle for milk cans comprising a pair of identical loop forming members, each member comprising a substantially U-shape body having a journal portion on one end, and having a flat sided portion on its other end extending beyond the journal portion, whereby a pair of the members may be fitted at their journal portions in the hinge bracket of a milk can with the flat sided portions overlapped and secured together to provide a two-piece handle.

3. A two-piece handle for milk cans and the like, comprising a pair of identical loop sections with journal portions on one end adapted to fit in the opposite ends of a hinge bracket of a milk can and having elongated opposite ends with flat sides adapted to be overlapped and secured in superposed relation for completing the handle and for retaining the journal portions in the bracket.

4. A handle section for use on milk cans and the like, comprising a substantially U-shaped member having a long end and a short end, the short end being round to provide a journal for engagement in one end of a hinge bracket of a can, and the long end having a flat side adapted to overlap and be secured to a similar member fitting in the opposite end of the hinge bracket for completing the handle and holding it to the hinge bracket.

5. A handle for milk cans or the like comprising two members each constructed in substantially U-shaped form with one limb shorter than the other and having its end shaped to fit a socket bearing, the longer limb having a reduced end portion adapted to overlap a correspondingly shaped end portion of the other limb, and means carried by said reduced end portions for rigidly securing them together; thereby securing said shorter limbs in said socket bearing without other fastening means and leaving an unobstructed space between said shorter and longer arms one of said members being a counterpart of the other and interchangeable therewith.

In testimony whereof, I have affixed my signature to this specification.

FRED T. TOFFEY.